United States Patent [19]
Phillips

[11] Patent Number: 6,105,264
[45] Date of Patent: Aug. 22, 2000

[54] AUTOMOBILE FRAME DIMENSIONING TOOL

[76] Inventor: Jeff Phillips, 86624 Bailey Hill Rd., Eugene, Oreg. 97405

[21] Appl. No.: 08/921,491

[22] Filed: Sep. 2, 1997

[51] Int. Cl.[7] ................................................. G04B 5/03
[52] U.S. Cl. ........................................ 33/288; 33/DIG. 21
[58] Field of Search ............................. 33/288, 286, 608, 33/290, DIG. 21

[56] References Cited

U.S. PATENT DOCUMENTS

| | | |
|---|---|---|
| 3,471,234 | 10/1969 | Studebaker ......................... 33/DIG. 21 |
| 3,824,666 | 7/1974 | Roodvoets et al. ...................... 33/286 |
| 4,630,379 | 12/1986 | Wickmann et al. . |
| 4,683,663 | 8/1987 | Sarauer . |
| 4,691,443 | 9/1987 | Hamilton et al. . |
| 4,703,563 | 11/1987 | Hoshino et al. . |
| 4,718,171 | 1/1988 | Schlemmer et al. ................ 33/DIG. 21 |
| 5,029,397 | 7/1991 | Palombi . |
| 5,207,002 | 5/1993 | Humblet . |
| 5,341,575 | 8/1994 | Chisum . |
| 5,515,613 | 5/1996 | Hinson . |

*Primary Examiner*—Bernard Roskoski
*Attorney, Agent, or Firm*—Marger Johnson & McCollom, PC

[57] ABSTRACT

A laser measuring device, for accurately measuring and realigning damaged vehicle structural elements. The device comprises a body with a horizontal magnetic surface, a ruler which extends perpendicularly to the magnetic surface, a slide which moves along the ruler, and a laser affixed to the slide. The laser can be moved to a designated distance from the upper magnetic surface of the magnet. The laser is pivotally moveable relative to the slide so that the laser can be leveled. The laser includes a line generation prism to project a horizontal line from the laser. The invention is used in conjunction with an autobody frame and helps establish a horizontal (laser) datum line from which reference measurements can be taken to designated measurement points on the frame of the automobile.

20 Claims, 3 Drawing Sheets

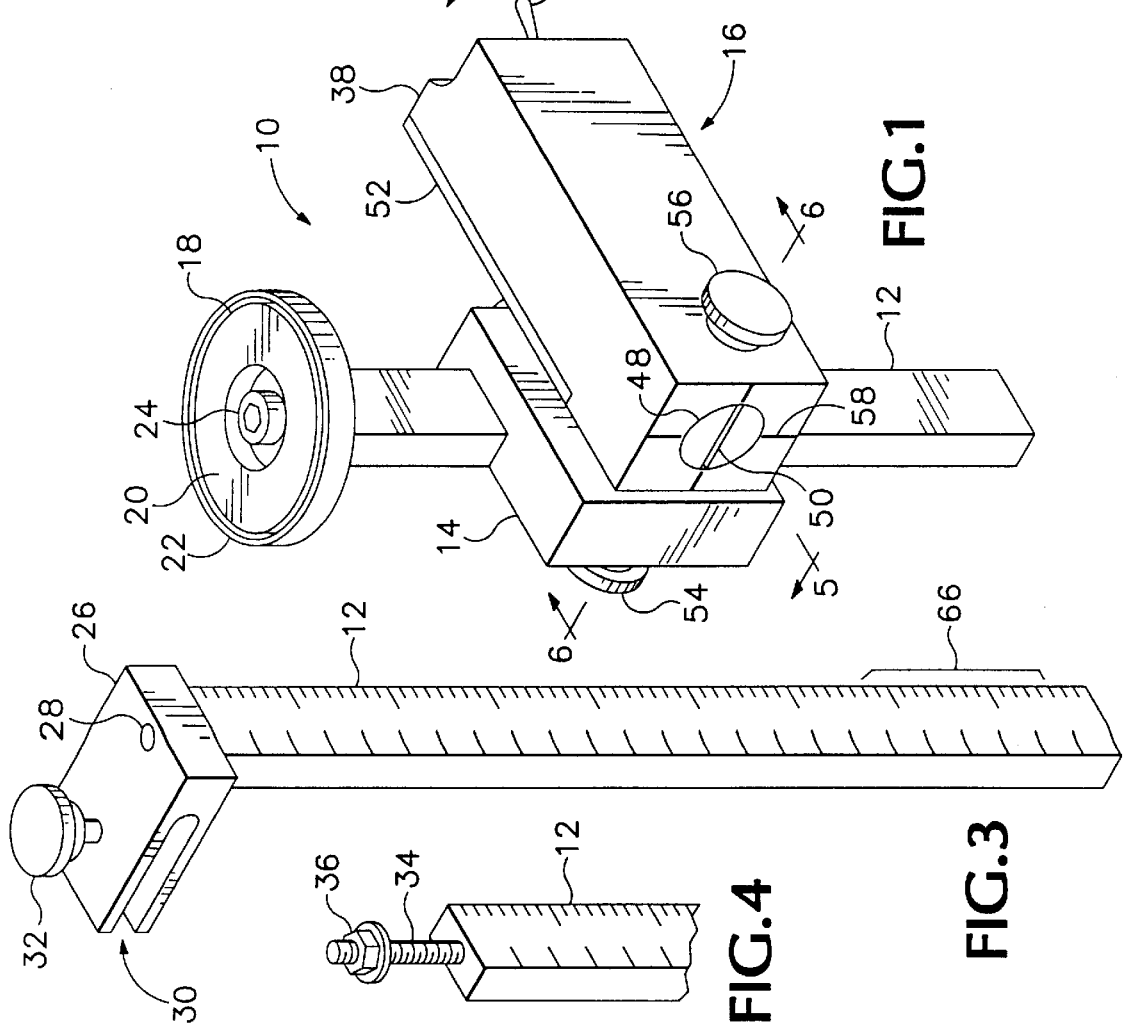

AUTOMOBILE FRAME DIMENSIONING TOOL

BACKGROUND OF THE INVENTION

This invention relates generally to a method and apparatus for checking and/or correcting alignment of a vehicle frame, body or various parts thereof.

Repairing frame damage in a car is a difficult proposition. If a car is in a head-on collision, the undercarriage frame elements on which the sheet metal is mounted is pushed out of alignment. This must be precisely realigned prior to outerbody repair. The principal frame alignment tool that is conventionally used for this purpose is known in the car repair industry as a ladder or rack system. One such ladder system is sold by Buske Industries of Gowrie, Iowa and includes a series of rails running longitudinally beneath the automobile, lateral rails slidably mounted along the longitudinal rails, and expandable measuring gauges mounted to the lateral rails for movement beneath the automobile. The rails form a horizontal datum line or plane beneath the automobile so that accurate measurements between the rails and the automobile frame can be obtained using the gauges. Other such systems are disclosed in U.S. Pat. No. 4,683,663 to Sarauer, U.S. Pat. No. 4,691,443 to Hamilton et al., and U.S. Pat. No. 5,341,575 to Chisum.

In use, the ladder system is placed underneath the automobile and pointers on the gauges brought upward into engagement with predetermined vehicle datum points on the car frame. The three dimensional positions of these vehicle datum points relative to one another are predetermined by manufacturing specifications. The rails and gauges are calibrated such that the pointers can be positioned where one would expect to find a vehicle reference datum point. If the vehicle datum points on the frame are not aligned with the pointers on the ladder system, then the frame is misaligned and must be pulled by suitable pull means so as to bring the datum point into its correct position above the pointer.

The disadvantages of such ladder systems in that the equipment is bulky (about the size of the automobile itself) and extremely expensive thus putting it out of reach of many automobile repair shops. Additionally, the ladder system is a complicated piece of machinery that can take as long as 2 hours or more to set up in preparation for frame straightening.

More sophisticated laser gauging apparatus have been developed recently for measuring a vehicle during repair or construction. These gauging apparatus usually involve mechanically mounting a laser on a rail system or to the vehicle frame. The laser projects a beam of light underneath the vehicle, thus forming a horizontal datum line or plane from which datum point measurements can be taken. Such systems are disclosed in U.S. Pat. No. 4,630,379 to Wickmann et al., U.S. Pat. No. 5,207,002 to Humblet and U.S. Pat. No. 5,515,613 to Hinson. Each require complicated mounting systems that, though potentially more accurate than ladder systems, do not necessarily decrease the time required to set up the equipment and perform the analysis.

Accordingly, a need remains for a simpler more affordable alternative to frame alignment systems known in the prior art.

SUMMARY OF THE INVENTION

It is, therefore, an object of the invention to decrease the time needed to align an automobile frame.

Another object of the invention is to provide a automobile frame alignment tool that is portable and simple to use.

According to the present invention, the above and other objects can be accomplished by a laser measuring device comprises a body with a horizontal magnetic surface, an elongate ruler which extends perpendicularly to the magnetic surface, a slide which moves along the elongate ruler, and a laser affixed to the slide. Locking means coupled with the laser and engageable with the elongate ruler fixedly position the laser along the length of the elongate ruler to a desired distance from the upper magnetic surface. The laser is pivotally moveable relative to the slide so that the laser can be leveled. The laser includes a line generation prism to project a horizontal line from the laser. The invention is used in conjunction with an automobile frame and helps establish a horizontal (laser) datum line from which reference measurements can be taken to designated reference datum points along the length of the frame of the automobile.

In use, the device is magnetically held to the underside of the ferrous-based automobile frame at a reference datum point along the frame and the slide (and attached laser) are moved down to the measurement designated by the manufacturer to establish a datum line. For non-ferrous frames, the laser measuring device is clamped or bolted to the automobile frame at the datum points. A second ruler is then positioned under an adjacent reference point so that the laser line shows on the second ruler at the measurement designated by the car manufacturer. The laser can be pivoted at this point to set this measurement thus leveling the datum line. The ruler can then be moved to the next point to obtain the next measurement and so on. If the measurement does not agree with the manufacturer's specifications, then the frame is misaligned and conventional auto-body techniques can be used to bring the frame into line.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 1 is a perspective view showing a preferred embodiment of the laser gauging apparatus constructed according to the present invention.

FIG. 2 is a rotated perspective view showing the laser gauging apparatus of FIG. 1.

FIG. 3 is a perspective view showing alternate attachment means for the apparatus of FIG. 1.

FIG. 4 is a perspective view showing another attachment means for the apparatus of FIG. 1.

DETAILED DESCRIPTION

Figure 5:
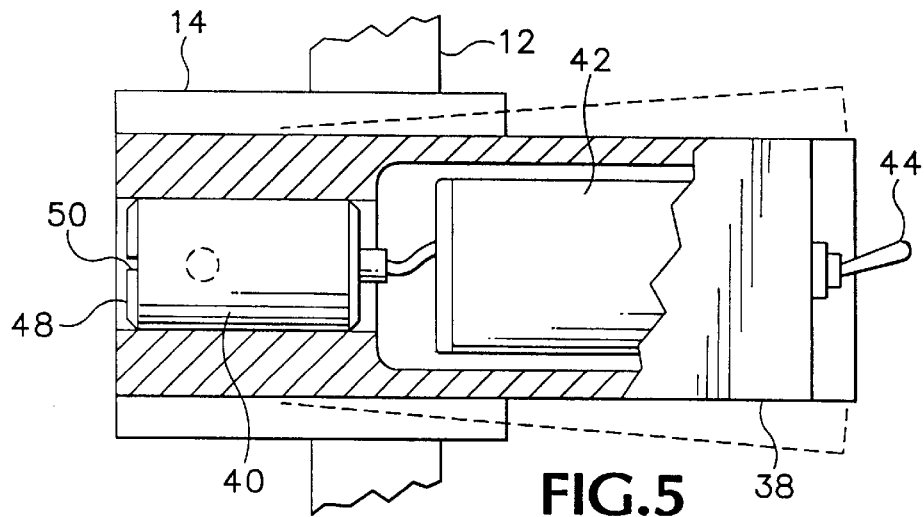
FIG. 5 is partial sectioned view showing the interior of the housing containing the laser means of the apparatus of FIG. 2 taken along lines 5—5. Dashed lines illustrate the pivoting of the housing in order to level the laser datum line established by the laser means.

FIGS. 1 and 2 show perspective views of a laser gauging apparatus 10 constructed according to a preferred embodiment of the invention. Apparatus 10 is characterized by an elongate member 12, a slide body 14 positionable along the length of the elongate member 12, laser generating means 16 pivotally attached to the slide body 14, and means for mounting the elongate member transversely to an automobile frame at one of the datum points.

The preferred means for mounting the elongate member 12 to ferrous-based materials, such as a steel automobile frame, uses a magnet. In the apparatus shown in FIGS. 1 and 2, a magnet 18 having a substantially planar upper magnetic surface 20 is received within a frame 22. The frame is affixed to one end of the elongate member 12, as by bolt 24 received through frame 22 and within a tapped hole (not shown) defined within the end of the elongate member.

FIGS. 3 and 4 illustrate alternate means for mounting the elongate member 12 transversely to the automobile frame. In FIG. 3, a bracket 26 is mounted at one end of the elongate member 12, as through the tapped hole previously mentioned in member 12 and a coaxial hole 28 defined within the bracket. Bracket 26 includes a slot 30 extending transversely to the length of the elongate member 12, the slot being adapted to receive a portion of the automobile frame. A clamping screw 32 on the bracket 26 moves into the slot 20 as the screw 32 is tightened, thus clamping the bracket and attached laser gauging apparatus onto the automobile frame. In FIG. 4, a headless bolt 34 is attached at one end of the elongate member 12. The bolt 34 is received through a hole on the underside of the automobile frame at the datum point location and a nut 36 threaded onto the bolt on the top side of the frame, thereby affixing the elongate member 12 to the frame. The means for mounting illustrated in FIGS. 3 and 4 are preferred when mounting the elongate member to non-ferrous based materials, such as an aluminum frame, where the magnetic attachment means will not work.

FIG. 5 illustrates the laser means contained within a housing 38 that is used to establish a horizontal datum line under the vehicle. Located within the housing is a laser 40 capable of generating a laser beam having a circular cross section and a battery 42 for supplying power to the laser. A switch 44 is operatively connected between the battery and the laser for selectively supplying power to the laser to turn it on and off. A line generating prism 46 or beam spreader (shown in FIG. 6), such as a cylindrical lens, is positioned in front of the laser for converting the laser beam to a horizontally extending beam. A cap 48, having a linear slot 50 defined thereacross, is affixed to the front of laser 40 to further define the linear extension of the laser beam. Such a line generating laser is available from Spectra Physics, Inc. of. The laser should be powerful enough such that the laser datum line, when projected onto a surface spaced up to four feet away (the maximum space between datum points), can be seen in ambient light. Lasers capable of projecting a beam having a horizontally extending portion and a vertically extending portion (as described in U.S. Pat. No. 4,630,379) can also be used.

A plate 52 (shown in FIGS. 1 and 2) can be removed to access the interior of housing 38 such as to replace battery 42. Dashed lines illustrate the position of laser means housing 38 when pivoted about the axis of screw 54 (shown best in FIG. 6) in order to level the laser datum line established by the laser means.

Figure 6:
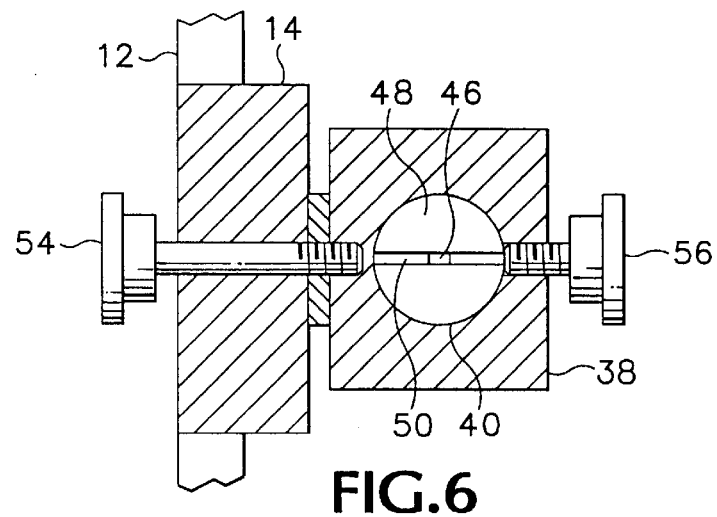
FIG. 6 is partial sectioned view showing the apparatus of FIG. 1 taken along lines 6—6.

FIG. 6 shows a sectioned view of the apparatus from a front view. A screw 54 pivotally attaches the laser means housing 38 to the slide body 14 of the laser gauging apparatus. As screw 54 is loosened, housing 38 rotates about the axis of the screw in a plane parallel to the elongate member 12. It will be appreciated that such pivoting action will allow the laser datum line to be leveled according to the method described below with reference to FIG. 8. A second screw 56 extends through one wall of housing 38 to frictionally bear against laser 40. As screw 56 is loosened, laser 40 (and coupled line generating prism 46 and cap 48) can rotate along its axis to change the orientation of the laser beam projected therefrom. Thus, for instance, the horizontally extending beam can be changed to a vertically extending beam by loosening screw 56, rotating laser 40 by ninety degrees, and tightening screw 56. The front of the laser means housing 38 can include score marks, such as alignment mark 58 (shown in FIGS. 1 and 2), that extend in a horizontal and vertical plane. The linear slot 50 can be aligned with such marks to calibrate the orientation of the laser. Relative to the elongate member 12.

Figure 7:
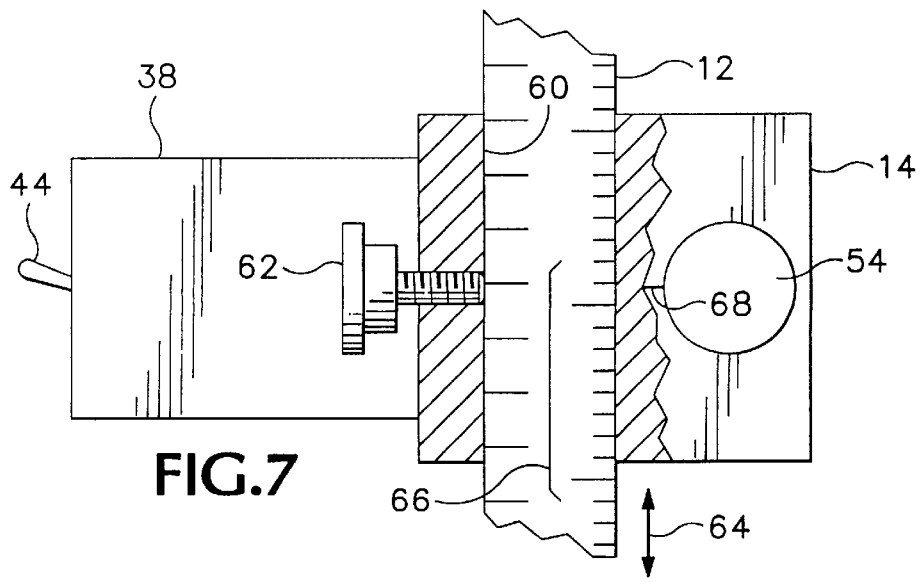
FIG. 7 is partial sectioned view showing the locking means of the apparatus of FIG. 2 taken along lines 7—7.

FIG. 7 shows the locking means by which the slide body 14 and coupled laser means housing 38 are fixedly positioned along the length of the elongate member 12. In its preferred embodiment, slide body includes a slot 60 into which the elongate member 12 is slidably received. A screw 62 extends through one wall of slide body 14 and into the slot 60 to frictionally bear against the received elongate member 12. As screw 62 is loosened, the slide body 14 and coupled laser means housing 38 can be moved in the direction of arrow 64 so that the laser is closer or further away from the upper magnetic surface 20 (FIGS. 1 and 2).

In its preferred embodiment, the laser gauging apparatus includes measuring means for accurately positioning the laser means 16 along the length of the elongate member 12. Most preferably, ruled marks 66 are defined along the length of the elongate member 12 much like a ruler. These marks are indicative of a distance from the upper magnetic surface 20 and not simply from the terminal end of the elongate member. A centering mark 68 is defined on the slide body adjacent the slot 60 that receives elongate member 12 and coplanar with the horizontally extending laser beam. To set the datum line distance beneath the datum point, centering mark 68 is aligned with a selected one of the ruled marks 66 along the length of the elongate member 12 depending upon the desired distance at which the laser means 16 is to be positioned from the upper magnetic surface 20. Thus, for instance, if manufacturer documentation specifies that the datum line is to be set at 13.50 inches from the first datum point on the automobile frame, then the laser gauging apparatus is magnetically mounted to the first datum point and the slide body and laser are moved along the ruled elongate member until the centering mark is set to 13.50 inches.

Figure 8:
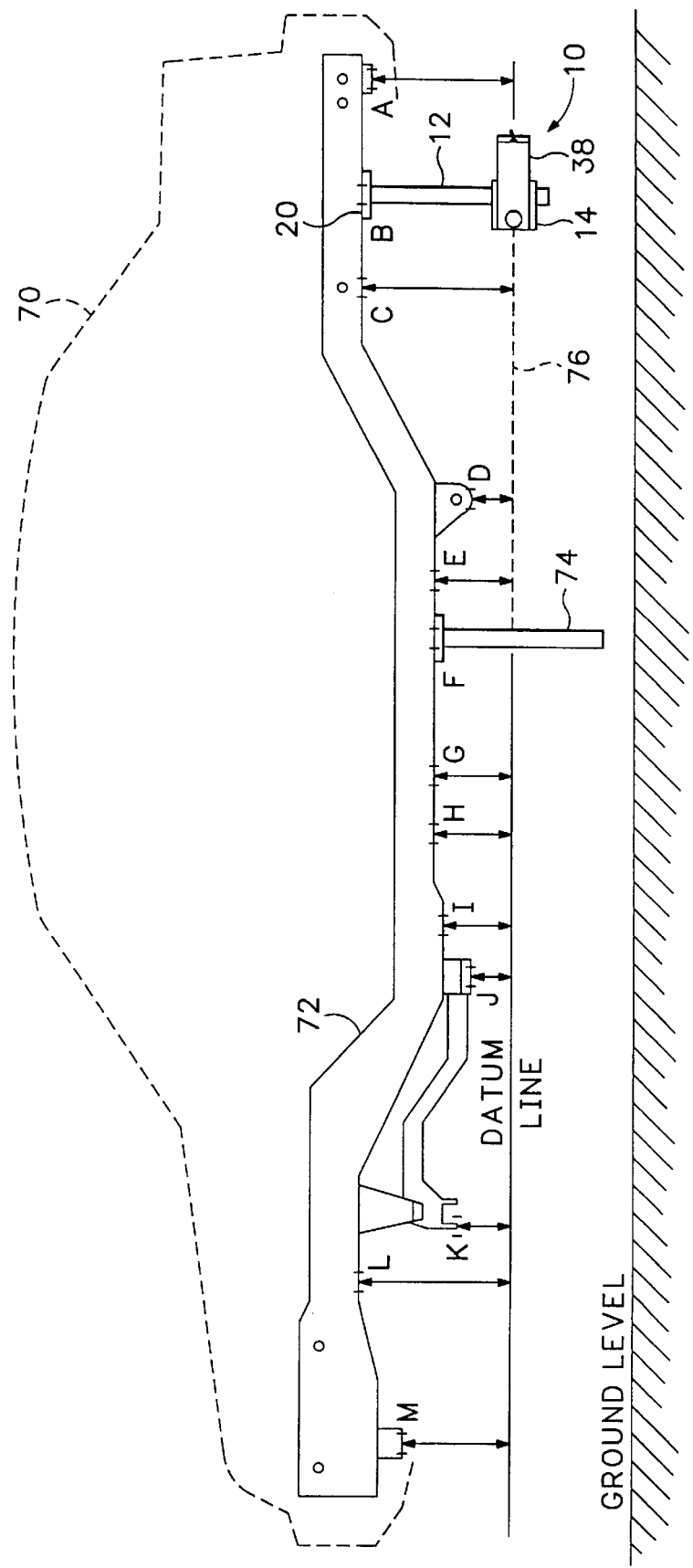
FIG. 8 is a side elevation of the invention of FIG. 1 shown in use on an automobile frame.

FIG. 8 illustrates the method for using the laser gauging apparatus according to the present invention. The side view silhouette of an automobile is shown in dashed lines at 70 and includes a structural support frame 72 shown in solid lines. The automobile frame 72 includes a plurality of calibration or datum points (labeled A through M) that are defined along the length of the automobile frame. These datum points are typically identified by some physical feature such as an aperture defined in the underside of the frame. Each of the datum points is associated with a respective reference measurement established by the original manufacturer of the automobile. These reference measurements indicate, for an aligned and structurally undamaged automobile frame, the vertical distance between each of these datum points and a datum line. These measurements are indicated in FIG. 8 by the arrows spanning between each of the datum points and the datum line.

To practice the present aligning method using the laser gauging apparatus described above, the upper magnetic surface 20 of the laser gauging apparatus 10 is magnetically mounted to the automobile frame 72 at a selected one (here B) of the datum points. A second elongate member 74, having ruled lines defined therein identical to elongate member 12, is mounted transversely to the vehicle frame 72 at a second one (here F) of the predetermined datum points in spaced relation to the laser gauging apparatus 10.

The preferred method for establishing a datum line using the laser gauging apparatus 10 and the second elongate member 74 includes the following steps. First, the laser gauging apparatus and the second elongate members are mounted from datum points defined in a portion of the automobile frame that is known to be aligned. For instance, if the car was known to be in a front end collision, then the rear-most datum points are used to establish a datum reference line.

The laser means housing 38 is then fixedly positioning along the length of the elongate member 12 a predetermined distance from the upper magnetic surface 20. For instance, the measurement point from datum point B at the far right of the frame (on which the invention is used) might have a 12.30" vertical reference measurement from the frame to a horizontal "datum reference line". The device is magnetically held to the underside of the steel frame at datum point B and the slide body 14 (and attached laser) moved down to the 12.30" measurement along the ruled elongate body 12. A second ruled elongate member 74 is then placed under the second datum reference point to the left of the first (e.g. datum point F as shown in FIG. 8) so that the horizontally extending beam of the laser (shown in dashed lines at 76) is projected onto the second ruled elongate member at the designated factory measurement (e.g. 7.50"). If the measurement is off, then the laser datum line can be leveled by using pivoting screw 54 (FIG. 6) until the distance between the horizontally extending beam 76 and the second one of said predetermined datum points, as measured along the second elongate member 74, is equal to the predetermined reference measurement for the second one of the predetermined datum points.

Once the datum line has been leveled, the second elongate member 74 is moved to a third one of the predetermined datum points (e.g. J). The horizontally extending beam 76 is then projected onto the second elongate member and the measured distance between the horizontally extending beam and said third one of the predetermined datum points is determined. One then compares this measured distance with the predetermined reference measurement for that datum point. If the measured distance does not match the reference measurement, then the automobile frame is out of alignment at than datum point and must be realigned using known pulling means until the measured distance is equal to the reference measurement.

Preferably, the laser gauging apparatus 10 and the second elongate member 74 are first mounted on adjacent datum points at the end of the automobile frame directly opposite the location in which the structural damage was to have taken place. For instance, in a front end collision, the laser gauging apparatus 10 is magnetically mounted at datum point A and the second elongate member 74 is mounted at datum point B. The datum line is established as above. Then, the apparatus 10 and second elongate member 74 are moved step wise toward the front of the automobile. That is, the apparatus 10 is moved to datum point B and set to the reference measurement, and the second elongate member is moved to datum point C. A measured distance for datum point C is then taken and the frame aligned if needed, and so forth down to the datum point M at the front of automobile. It is understood, however, that elongate members could be mounted transversely to the vehicle frame at each of the successive datum points although the laser datum line might be occluded by other such elongate members interposed between the other elongate members and the laser gauging apparatus.

Having described and illustrated the principles of the invention in a preferred embodiment thereof, it should be apparent that the invention can be modified in arrangement and detail without departing from such principles. I claim all modifications and variation coming within the spirit and scope of the following claims.

I claim:

1. A laser gauging apparatus comprising:
   a vehicle frame;
   an upper magnetic surface adapted to be attached to said vehicle frame;
   an elongate member extending transversely from said upper magnetic surface;
   laser means; and
   locking means coupled with said laser means and engageable with said elongate member for fixedly positioning said laser means along the length of said elongate member a desired distance from said upper magnetic surface.

2. The laser gauging apparatus of claim 1 wherein said laser means includes a line generator for projecting a horizontally extending beam beneath said vehicle frame, said horizontal beam defining a horizontal datum line under said vehicle frame from which measurements to said vehicle frame are obtainable.

3. The laser gauging apparatus of claim 1, further including a slide body coupled to said elongate member by said locking means, wherein said laser means is pivotally attached to said slide body for pivotal movement of said laser means in a plane parallel to said elongate member.

4. The laser gauging apparatus of claim 3 wherein said slide body includes a slot into which said elongate member is slidably received.

5. The laser gauging apparatus of claim 1, further including measuring means for accurately positioning said laser means along the length of said elongate member the desired distance from said upper magnetic surface.

6. The laser gauging apparatus of claim 5 wherein said measuring means includes:
   a plurality of ruled marks defined along the length of the elongate member indicative of a distance from the upper magnetic surface; and
   a centering mark coplanar with said laser means and adapted to be aligned with a selected one of the ruled marks along the length of the elongate member depending upon the desired distance at which the laser means is to be positioned from the upper magnetic surface.

7. The laser gauging apparatus of claim 1, further including a second elongate member including means for mounting said second elongate member transversely to the vehicle frame in parallel and spaced relationship to said elongate member, said second elongate member including a plurality of ruled marks defined along the length of the elongate member, wherein said laser means is adapted to project a horizontally extending beam beneath said vehicle frame to said second elongate member, said horizontal beam defining a horizontal datum line under said vehicle from which measurements to said vehicle frame along the second elongate member are obtainable.

8. A laser gauging apparatus comprising:
   a vehicle frame having a plurality of datum points defined along a datum line;

an elongate member;

means for mounting said elongate member transversely to the vehicle frame at one of said predetermined datum points;

laser means slidably mounted on said elongate member for projecting a horizontally extending beam beneath said vehicle, said horizontal beam defining a horizontal datum line under said vehicle from which measurements between said predetermined datum points and said datum line are obtainable; and locking means engageable between said laser means and said elongate member for fixedly positioning said laser means along a length of said elongate member a desired distance from said one of the predetermined datum points.

9. The laser gauging apparatus of claim 8, wherein said means for mounting includes an upper magnetic surface adapted to be magnetically attached to said vehicle frame.

10. The laser gauging apparatus of claim 8, wherein said means for mounting includes a bolt attached at one end of the elongate member and a nut threaded on said bolt.

11. The laser gauging apparatus of claim 8, wherein said means for mounting includes a bracket mounted at one end of the elongate member, said bracket including a slot adapted to receive a portion of the vehicle frame, said bracket including clamping means for clamping such portion of the vehicle frame within the slot.

12. The laser gauging apparatus of claim 8, further including:

a second elongate member; and means for mounting said second elongate member transversely to the vehicle frame at a second one of said predetermined datum points in spaced relation to said elongate member, said second elongate member including a plurality of ruled marks defined along the length of the elongate member so that when the horizontally extending beam of said laser means intersects said second elongate member, the distance between the datum line established by the horizontally extending beam and the second one of said predetermined datum points can be determined.

13. The laser gauging apparatus of claim 8, further including a slide body coupled to said elongate member by said locking means, wherein said laser means is pivotally attached to said slide body for pivotal movement of said laser means in a plane parallel to said elongate member.

14. The laser gauging apparatus of claim 13, wherein said slide body includes a slot into which said elongate member is slidably received.

15. The laser gauging apparatus of claim 8, wherein said laser means includes:

a laser for generating a laser beam having a circular cross section;

a line generating prism positioned in front of the laser for converting the laser beam to a horizontally extending beam;

a battery; and a switch operatively connected to the battery for selectively supplying power from the battery to the laser.

16. A method for aligning a misaligned automobile frame, said automobile frame of a type having a plurality of datum points defined along the length of the automobile frame and reference measurements associated therewith indicative of a distance between each of said datum points and a datum line for an aligned automobile frame, the method comprising:

providing a laser gauging apparatus having an upper magnetic surface, an elongate member extending transversely from said upper magnetic surface, laser means and locking means coupled with said laser means and engageable with said elongate member for fixedly positioning said laser means along the length of said elongate member a desired distance from said upper magnetic surface;

magnetically mounting the upper magnetic surface of the laser gauging apparatus to the automobile frame at a selected one of the datum points;

mounting a second elongate member transversely to the vehicle frame at a second one of said predetermined datum points in spaced relation to said laser gauging apparatus;

establishing a datum line using said laser gauging apparatus and said second elongate member;

moving said second elongate member to a third one of said predetermined datum points;

projecting a horizontally extending beam from said laser means to said second elongate member;

determining a measured distance between said horizontally extending beam and said third one of said predetermined datum points;

comparing said measured distance with a predetermined reference measurement for said third one of said predetermined datum points; and realigning said automobile frame if said measured distance is different from said reference measurement until said measured distance is equal to said reference measurement.

17. The method according to claim 16, wherein the step of establishing a datum line includes:

mounting the laser gauging apparatus and the second elongate members from datum points that are known to be aligned;

fixedly positioning said laser means along the length of said elongate member a predetermined distance from said upper magnetic surface;

projecting a horizontally extending beam from said laser means to said second elongate member; and leveling the laser means until a distance between the horizontally extending beam and the second one of said predetermined datum points as measured along the second elongate member is equal to a predetermined reference measurement for said second one of said predetermined datum points.

18. The method according to claim 16, further including the step moving the second elongate member to successive datum points and repeating the projecting, determining, comparing, and realigning steps until the automobile frame is completely aligned.

19. A method for aligning a misaligned automobile frame, said automobile frame of a type having a plurality of datum points defined along the length of the automobile frame and reference measurements associated therewith indicative of a distance between each of said datum points and a datum line for an aligned automobile frame, the method comprising:

providing a laser gauging apparatus having an upper magnetic surface, an elongate member extending transversely from said upper magnetic surface, laser means and locking means coupled with said laser means and engageable with said elongate member for fixedly positioning said laser means along the length of said elongate member a desired distance from said upper magnetic surface;

magnetically mounting the upper magnetic surface of the laser gauging apparatus to the automobile frame at a selected one of the datum points;

mounting a second elongate member transversely to the vehicle frame at a second one of said predetermined datum points in spaced relation to said laser gauging apparatus;

establishing a datum line using said laser gauging apparatus and said second elongate member;

mounting a third elongate member transversely to the vehicle frame at a third one of said predetermined datum points;

projecting a horizontally extending beam from said laser means to said third elongate member;

determining a measured distance between said horizontally extending beam and said third one of said predetermined datum points;

comparing said measured distance with a predetermined reference measurement for said third one of said predetermined datum points; and realigning said automobile frame if said measured distance is different from said reference measurement until said measured distance is equal to said reference measurement.

20. The method according to claim 19, further including the step mounting respective elongate members to each of said datum points and repeating the projecting, determining, comparing, and realigning steps until the automobile frame is completely aligned.

* * * * *